United States Patent [19]
Kosik et al.

[11] Patent Number: 6,047,800
[45] Date of Patent: Apr. 11, 2000

[54] AUTOMATIC CLUTCH

[75] Inventors: Franz Kosik, Ostfildern; Thomas Grass, Urbach, both of Germany

[73] Assignee: DaimlerChrysler AG, Stuttgart, Germany

[21] Appl. No.: 09/269,277

[22] PCT Filed: Sep. 18, 1997

[86] PCT No.: PCT/DE97/02148

§ 371 Date: Mar. 25, 1999

§ 102(e) Date: Mar. 25, 1999

[87] PCT Pub. No.: WO98/13619

PCT Pub. Date: Apr. 2, 1998

[30] Foreign Application Priority Data

Sep. 25, 1996 [DE] Germany .................. 196 39 291

[51] Int. Cl.[7] ................................. F16D 48/06
[52] U.S. Cl. ............... 192/3.57; 192/3.62; 192/70.25; 192/111 R
[58] Field of Search .................. 192/3.55, 3.57, 192/3.61, 3.62, 70.25, 111 R

[56] References Cited

U.S. PATENT DOCUMENTS 4,765,450  8/1988  Kurihara et al. ............... 192/3.62 X
5,005,680  4/1991  Satoh et al. ....................... 192/3.55

FOREIGN PATENT DOCUMENTS

| | | |
|---|---|---|
| 0 494 608 | 7/1992 | European Pat. Off. . |
| 2 649 366 | 1/1991 | France . |
| 30 32 558 | 3/1982 | Germany . |
| 30 43 348 | 7/1982 | Germany . |
| 36 01 708 | 7/1987 | Germany . |
| 43 24 810 | 1/1995 | Germany . |

*Primary Examiner*—Charles A Marmor
*Assistant Examiner*—Saúl Rodríguez
*Attorney, Agent, or Firm*—Evenson, McKeown, Edwards & Lenahan, PLLC

[57] ABSTRACT

The invention concerns an automatic clutch in a motor vehicle drive train. An automatic control device constantly determines values for the travel of an adjusting unit actuating the clutch and associated values of the moment transmitted by the clutch in order to establish whether the travel available is sufficient to reach a threshold value of the transmitted coupling moment. A warning signal is optionally emitted.

5 Claims, 2 Drawing Sheets

AUTOMATIC CLUTCH

BACKGROUND AND SUMMARY OF THE INVENTION

The invention concerns an automatic clutch in the drive train of a motor vehicle, having a motorized adjusting unit which actuates the clutch and is controlled by a system of sensors which allows a moment respectively transmitted by the clutch to be determined. The system of sensors senses whether the clutch is operating with slip and assigns the value of the transmitted moment of the clutch when slip is occurring to the respective value of the travel of the adjusting unit as the moment which can be transmitted by the clutch. The system further evaluates the moment value together with the travel value for adapting a characteristic curve or table of values reflecting the dependence between the clutch moment and the travel of the adjusting unit.

In motor vehicles having customary internal combustion engines, a transmission is arranged in the drive train. The transmission allows the transmission ratio between the speed of the vehicle engine and the speed of the drive wheels to be changed according to the respective traveling speed and loading of the vehicle. In the case of customary manually shifted transmissions, during a change of drive position the power flow between the engine and the drive wheels has to be interrupted by releasing a clutch.

It is known in principle to use automatic clutches for this purpose, i.e. the clutch is automatically released when changing the transmission stage and is subsequently re-engaged.

In addition, the clutch is also automatically controlled when starting the vehicle. As soon as a drive position suitable for starting has been selected, the clutch can, for example, be automatically engaged lightly in such a way that a small torque adequate for making the vehicle start to creep forward is transmitted. As soon as the engine power and the engine speed are increased by actuating a gas pedal or some other power control element, the clutch is automatically controlled in the sense of increasing the transmissible torque. To put it in simple terms, the clutch is then increasingly engaged.

These known automatic clutches operate in the manner of friction clutches, the frictional engagement of which is controlled by the assigned adjusting unit of the clutch.

The friction linings of such clutches are subjected to unavoidable wear. This has the consequence that the maximum torque which can be transmitted by the clutch may fall below the torque which can be generated by the engine and the clutch may, as a result, "slip" comparatively frequently. The frictional heat thereby produced may lead to the clutch being destroyed.

In the case of a manually actuated clutch, the state of wear can often be detected from the amount of pedal travel or the actuating force, or in some other way from the "actuating feel".

In the case of an automatic clutch, it is known in principle to monitor parameters correlated with the clutch wear.

In the case of an automatic clutch known from German Patent document DE 30 43 348 A1, the point of engagement of the clutch is detected by sensing the operating behavior of an electric servo motor of the clutch. A characteristic change in the electrical drive current of the electric motor occurs at the point of engagement. The actual position of the point of engagement of the clutch determined in this way is reported to a set point generator. The set point generator is provided as part of the clutch control and predetermines parameter-dependently the desired positions of the electric motor in the clutch control. Consequently, the setpoint generator can adapt the emitted setpoint signals to the actual state. As soon as an excessive shift in the point of engagement is established, a wear signal is generated.

For monitoring the frictional loss of a friction clutch and for monitoring the wear of the friction lining, it is known from German Patent document DE 36 01 708 A1 to calculate the instantaneous frictional loss from the moment transmitted at a given instant by the clutch and the difference between the speed of the clutch on the input side and the speed of the clutch on the output side. The average frictional loss of the clutching operation is determined from this. Each time after starting to drive the vehicle, the average frictional loss values of the clutching operations occurring after starting are summed and, after taking into account standard values for cooling, are compared with a maximum permissible frictional loss value predetermined for the clutch. If a maximum permissible frictional loss value is exceeded, a warning signal for thermal overloading of the clutch is emitted. By monitoring the slip of the clutch in the state of thermal overloading, a criterion for impermissibly high wear of the friction linings of the clutch can be obtained.

It is known from French Patent document FR 2 649 366 A in the case of an automatic clutch to compare an actual characteristic curve between the clutch moment and the travel of the associated adjusting unit with stored limiting characteristic curves for a clutch having no wear or an inadmissibly worn clutch. This is done in order to be able to emit a warning signal in good time when the clutch is considerably worn.

German Patent document DE 43 24 810 A1 concerns an automatic clutch of the above-mentioned type and describes a control process for an infinitely variable flexible drive mechanism with a clutch serving as a limiter for the transmissible torque. In this case, the slipping moment of the clutch is determined cyclically or anticyclically and the level of the clutch pressure is compared with a characteristic curve. The comparison fixes a correction value by which the characteristic curve is adapted.

The object of the invention is thus to provide an automatic clutch with exact wear indication.

This object is achieved according to the invention by bringing the adjusting unit of the clutch at least for a short time into its end position for the engaged clutch under normal driving conditions in order to determine a remaining amount of travel. A warning signal is generated if the maximum transmissible clutch moment which can be achieved when the travel is exhausted falls below a threshold value.

The invention is based on the general idea of regularly sensing the moment actually transmitted by the clutch as well as the travel of the adjusting unit, and determining from this the maximum value for the torque which can be transmitted by the clutch when the travel available for the adjusting unit is exhausted. Alternatively, it is determined whether a predetermined threshold value of the transmissible moment is exceeded when the travel is exhausted. This makes use of the fact that the moment $M_K$ respectively transmitted by the clutch can be easily determined as follows from the respective engine torque $M_M$ and the moment of inertia of the engine $J_M$, predetermined by the design of the engine, and the change in speed over time of the engine $dw/dt$:

$$M_K = M_M - J_M dw/dt.$$

Since modern motor vehicle engines are provided with automatic engine control, which constantly senses the torque generated by the engine, or analogous variables, as well as the engine speed, the engine parameters necessary for the determination of the moment actually transmitted by the clutch are constantly available. Thus, if the travel of the adjusting unit is also sensed, it can be constantly established which torque is transmitted, or can be transmitted, in the respective position. This offers the possibility of generating a warning signal as soon as the "travel reserve" is no longer adequate.

According to the invention, it is constantly checked whether the clutch is slipping or not. For this purpose, the speed on the input side of the clutch (this speed is predetermined by the engine speed) may be compared with the speed on the output side of the clutch (this speed can be determined from the speeds of the drive wheels and the transmission ratio of the respective transmission stage). As soon as slippage of the clutch is established, the moment respectively transmitted by the clutch is assigned to the respective travel of the adjusting unit as the transmissible moment. The values mutually assigned are stored and constantly adapted, so that there is a characteristic curve or a corresponding table of characteristic values reproducing the moment which can be transmitted by the clutch as a function of the travel of the adjusting unit.

Otherwise, with regard to preferred features of the invention, reference is made to the claims and the following explanation of the drawing, on the basis of which particularly advantageous embodiments are described.

DETAILED DESCRIPTION OF THE DRAWINGS

Figure 1:
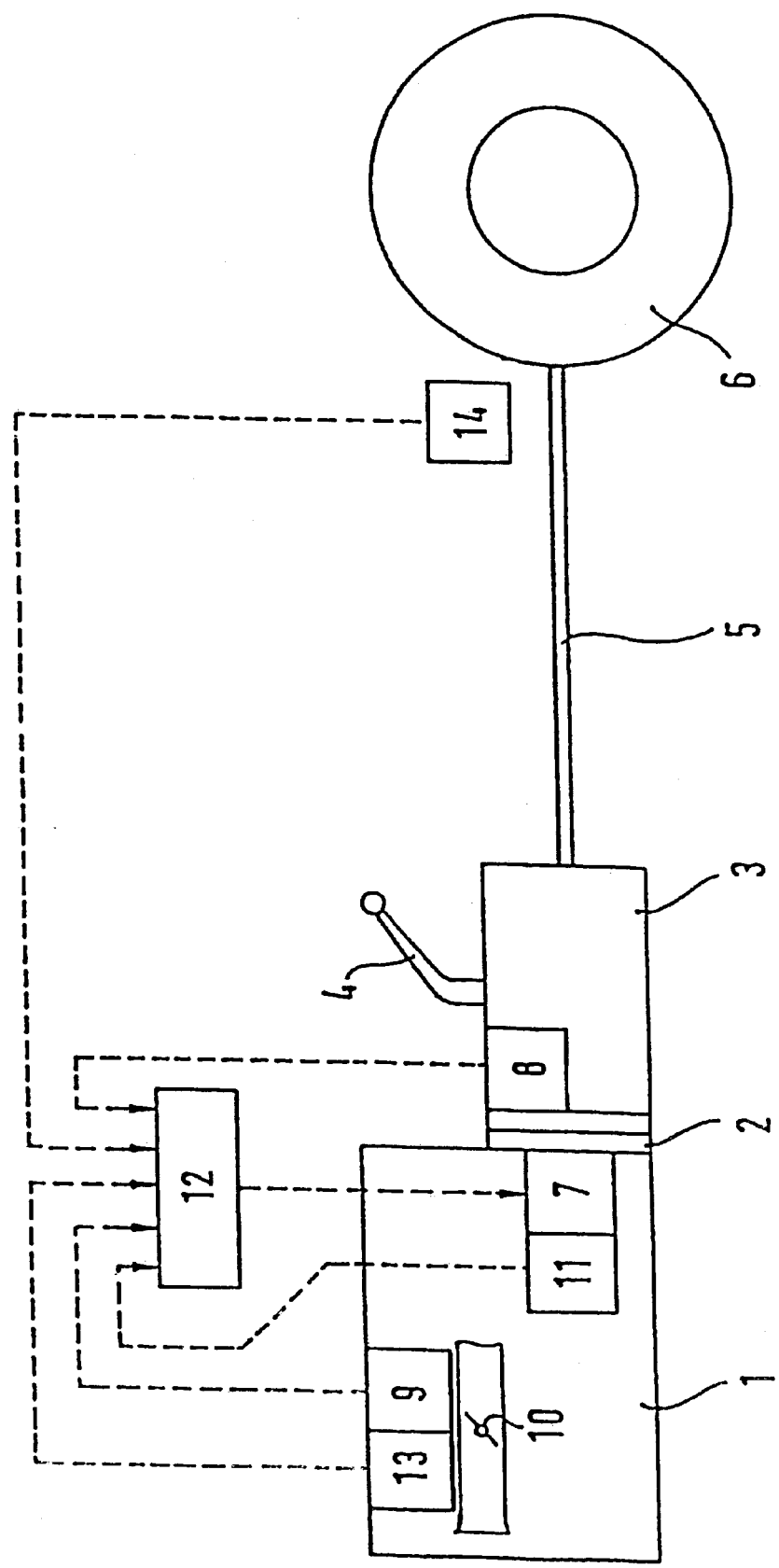
FIG. 1 shows a schematic representation of a drive train of a motor vehicle as well as the components essential for the clutch control.

According to FIG. 1, an internal combustion engine 1 is connected in drive terms via an automatically actuated clutch 2 and a transmission 3. The drive positions or gears of the transmission are changed by manual actuation of a shift lever 4. The transmission is coupled with a drive shaft 5, for example a cardan shaft, in order to drive wheels 6 of a motor vehicle, otherwise not represented in any more detail.

The actuation of the clutch 2 takes place automatically by means of a motorized adjusting unit 7. For controlling the unit 7, a system of sensors is provided for monitoring various parameters of the driving operation.

This system of sensors comprises a sensor arrangement 8, which is assigned to the transmission 3 or the shift lever 4 and senses the positions and/or movements of the latter and consequently "knows" the respectively selected drive position or the respectively engaged gear.

The position of an element serving for controlling the power of the engine 1, for example a throttle valve 10 of the air intake system of the engine 1, is registered by a sensor 9.

The system of sensors further comprises a displacement pickup 11, which is assigned to the adjusting unit 7 and senses the position of the latter, and consequently a parameter which is analogous to the value of the moment which can be transmitted by the automatic clutch 2.

The control circuit 12 also communicates with an engine control 13, which has the task, inter alia, of maintaining the engine speed at a minimum speed, for instance the idling speed, to the greatest extent independently of the loading of the engine. This engine control 13 also generates signals which reproduce the respective speed of the engine 1 and/or the torque respectively generated by the engine 1.

The control circuit 12 otherwise communicates with speed pickups 14, which are assigned to the vehicle wheels.

On the basis of the exchange of information with the engine control 13, the control circuit 12 can determine the torque actually transmitted in each case by the clutch 2. At the same time, the control circuit 12 knows the position of the adjusting unit 7. In addition, the control circuit 12 can, on the basis of the signals of the engine control 13, which also reproduces the speed of the engine 1, and the signals of the speed pickups 14 together with the signals coming from the sensor arrangement 8 and indicating the engaged transmission gear, and consequently the respective transmission ratio, establish whether the clutch 2 is "slipping", i.e. whether the speeds of the input side and of the output side of the clutch 2 deviate from one another. Should this be the case, the respective position of the adjusting unit 7 is assigned to the torque respectively transmitted by the clutch 2, since with a slipping clutch 2 the moment actually transmitted in each case by the clutch 2 corresponds to the moment which can be transmitted in the assigned position of the adjusting unit 7.

If, on the other hand, the clutch 2 is not slipping, i.e. if the speed on the input side of the clutch 2 coincides with the speed on the output side of the clutch 2, the moment transmitted in each case by the clutch 2 merely represents the minimum value of the moment which can be transmitted in the respective position of the adjusting unit 7.

As a result, the control circuit 12 can thus constantly determine and store mutually assigned values between the travel of the adjusting unit 7 and the moment which can be transmitted by the clutch 2, and can extrapolate from this whether the available travel of the adjusting unit 7 is adequate for reaching a threshold value of the transmissible moment of the clutch 2.

Should this not be the case, a warning signal is generated or stored in such a way that it can be interrogated.

In addition, if appropriate, the value of the maximum moment which can still be transmitted by the clutch 2 in each case can also be determined and stored in such a way that it can be interrogated, so that—for example during inspections of the vehicle—information on the state of the clutch 2 is always available.

Figure 2:
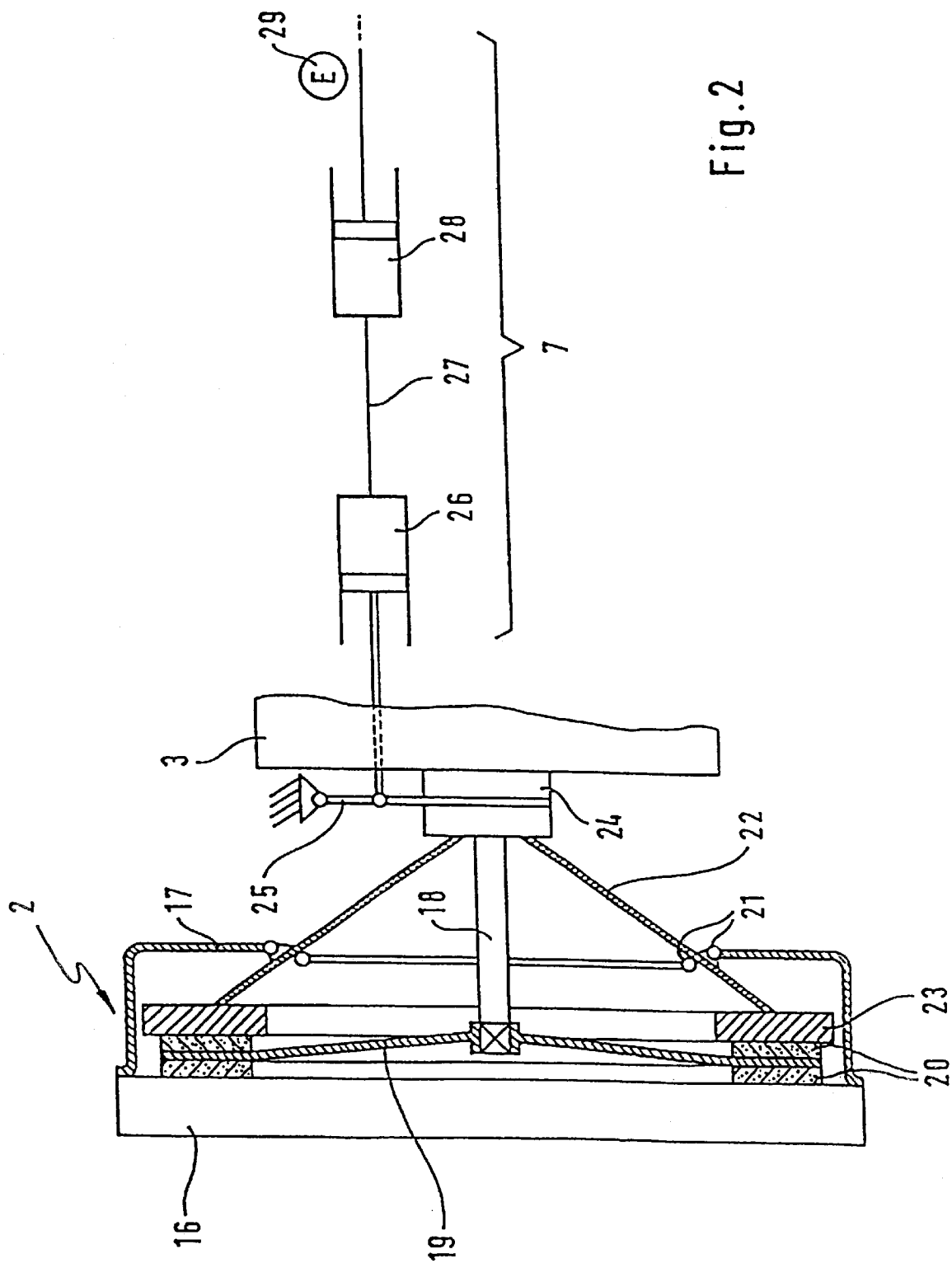
FIG. 2 shows a schematic representation of a hydraulically actuated clutch.

The engine 1 (not represented in FIG. 2 (cf. FIG. 1)) bears on an output part of its crankshaft a flywheel 16. The flywheel 16 is connected in a rotationally fixed manner to the crankshaft and is firmly connected to an essentially bell-shaped, annular clutch housing 17. Arranged coaxially with respect to the flywheel 16 is an input shaft 18 of the transmission 3. Connected in a rotationally fixed manner to this input shaft 18 is a driven plate 19 of the clutch 2. This driven plate 19 is designed to be axially compliant in such a way that friction linings 20, which are arranged on the outer periphery of the driven plate 19, on the two faces of the latter, can be pressed axially against the flywheel 16. Secured on the clutch housing 17 via bearing rings 21 is a diaphragm spring 22, the concave side of which faces the flywheel 16. On the outer periphery, the diaphragm spring 22 bears an annular pressure plate 23. The pressure plate 23 completely covers the friction linings 20 of the driven plate 19 radially—seen in the axial view. On the inner periphery, the diaphragm spring 22 is rotatably supported on a release bearing 24, which is rotatably mounted in an axially displaceable manner on the input shaft 18.

The release bearing 24 is grasped by a release fork 25. The fork 25 forms a lever which is movable about a pivot axis perpendicular to the axis of the input shaft 18. The release fork 25 is actuated by means of a hydraulic slave cylinder 26, which communicates via a hydraulic line 27 with a hydraulic master cylinder 28. The piston of the master cylinder 28 can be displaced in the example represented by an electric motor 29. Together with the slave cylinder 26, the hydraulic line 27 and the master cylinder 28, this electric motor 29 forms the adjusting unit 7 of FIG. 1 and is actuated by the control circuit 12 of FIG. 1.

The clutch 2 described above operates as follows:

The diaphragm spring 22 attempts to push the release bearing 24 to the right into an end position and to push the pressure plate 23 to the left in FIG. 2 in such a way that the driven plate 19 with its friction linings 20 is clamped axially between the mutually facing faces of the flywheel 16 and the pressure plate 23. A very high adherence is achieved between the flywheel 16 and the pressure plate 23 on the one hand and the driven plate 19 and the friction linings 20 on the other hand. If the release bearing 24 is displaced in the direction of the flywheel 16, in that the piston of the master cylinder 28 is pushed into the master cylinder 28 by means of the electric motor 29, the aforementioned adherence is initially reduced increasingly. On further displacement of the release bearing 24 to the left, the driven plate 19 with its friction linings 20 is then released axially between the flywheel 16 and the pressure plate 23, i.e. the clutch 2 is completely released.

The displacement pickup 11 of FIG. 1 may be assigned to the release fork 25, so that the signals of the displacement pickup 11 represent the position of the release fork or of the release bearing 24.

What is claimed is:

1. An automatic clutch in a drive train of a motor vehicle, said drive train having a motorized adjusting unit which actuates the clutch and is controlled by a system of sensors, which allows a moment respectively transmitted by the clutch to be determined, the system of sensors sensing whether the clutch is operating with slip, and assigning a value of the transmitted moment of the clutch when slip is occurring to a respective value of the travel of the adjusting unit as the moment which can be transmitted by the clutch and evaluating said moment value together with said travel value for adapting a characteristic curve or table of values reflecting the dependence between the clutch moment and the travel of the adjusting unit, wherein, for determining a remaining amount of travel, the adjusting unit is at least for a short time brought into its end position for the engaged clutch under normal driving conditions and a warning signal is generated if the maximum transmissible clutch moment which can be achieved when the travel is exhausted falls below a threshold value.

2. The clutch as claimed in claim 1, wherein a value for the maximum moment which can be transmitted by the clutch is determined or extrapolated from mutually assigned values of the travel of the adjusting unit and the transmissible moment of the clutch and is able to be interrogated.

3. The clutch as claimed in claim 2, wherein said value for the maximum moment which can be transmitted by the clutch is interrogated for vehicle inspection purposes.

4. An automatic clutch arranged in a drive train of a motor vehicle having a motorized adjusting unit, the automatic clutch comprising:

a sensor system for controlling the adjusting unit, said system allowing a moment respectively transmitted by the clutch to be determined, said system further sensing whether the clutch is operating with slip, and assigning a value of a transmitted moment of the clutch when slip is occurring to a respective value of the travel of the adjusting unit as the transmittable moment of the clutch;

wherein said sensor system evaluates said moment value together with said travel value for adapting a functional relationship reflecting the dependence between the clutch moment and the travel of the adjusting unit; and further wherein for determining a remaining amount of travel, the adjusting unit is at least for a short time period brought into an end position for the engaged clutch under normal driving conditions; and a warning signal generator for generating a warning signal if a maximum transmissible clutch moment achievable when the travel is exhausted falls below a threshold value.

5. A method of operating an automatic clutch in a drive train of a motor vehicle having a motorized adjusting unit which actuates the clutch and is controlled by a sensor system, the method comprising the acts of:

determining a moment transmitted by the clutch;

sensing whether the clutch is operating with slip;

assigning a value of the determined transmitted moment of the clutch when slip occurs to a respective travel value of the adjusting unit as a transmissible moment of the clutch;

evaluating said transmissible moment together with said travel value for adapting a functional relationship reflecting a dependence between the clutch moment and the travel of the adjusting unit;

bringing the adjusting unit into an end position in which the clutch is engaged under normal driving conditions to determine a remaining amount of travel of the adjusting unit; and generating a warning signal if a maximum transmissible clutch moment which is achievable when the remaining travel is exhausted falls below a defined threshold value.

* * * * *